United States Patent

Anderson

[15] 3,666,910
[45] May 30, 1972

[54] METHOD OF SOLID STATE BONDING AN ARTICLE TO A TUBE SURFACE

[72] Inventor: David G. Anderson, Bloomfield Hills, Mich.

[73] Assignee: Quanta Welding Company, Troy, Mich.

[22] Filed: Feb. 3, 1971

[21] Appl. No.: 112,250

[52] U.S. Cl..................................219/107, 219/86, 219/91, 219/117, 219/119
[51] Int. Cl........................................................B23k 11/04
[58] Field of Search....................219/85, 117, 91, 78, 86, 119

[56] References Cited

UNITED STATES PATENTS 2,305,042  12/1942  Thacker...................................219/91
3,462,577  8/1969  Helms et al. ..........................219/86 X
3,443,055  5/1969  Gwynn et al. .......................219/117 R Primary Examiner—J. V. Truhe
Assistant Examiner—L. A. Schutzman
Attorney—Wilson & Fraser

[57] ABSTRACT

An article of manufacture consisting of a fastener bonded to an exposed surface of a tube by a solid state pulse resistance weld at the faying interface between the fastener and the tube to form an integral unitary structure. The method of producing the unitary structure involves the utilization of unique welding structures wherein the parts being integrated are disposed in juxtaposed position followed by a time phased application of a force pulse and an electrical energy pulse to the assembled parts to produce a solid state resistance weld at the faying interface to achieve the desired structure.

7 Claims, 4 Drawing Figures

Patented May 30, 1972
3,666,910
2 Sheets-Sheet 1
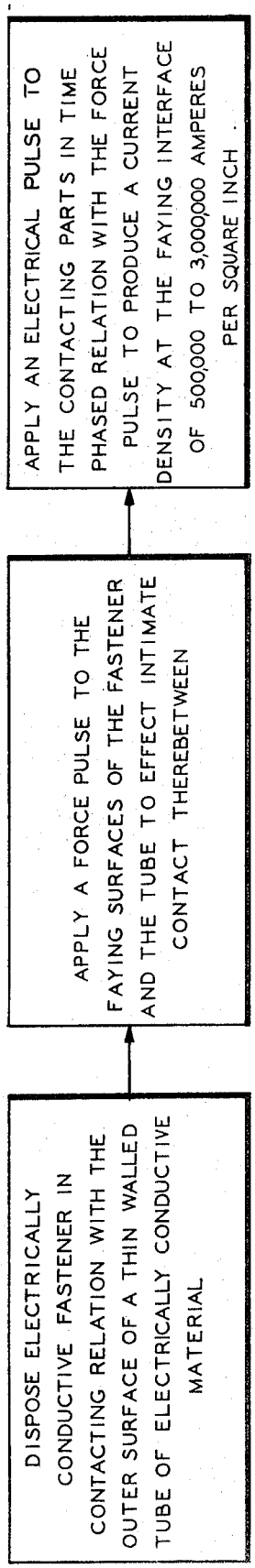
FIG. I
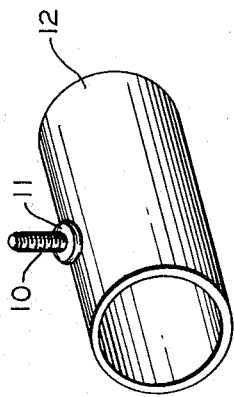
FIG. 4
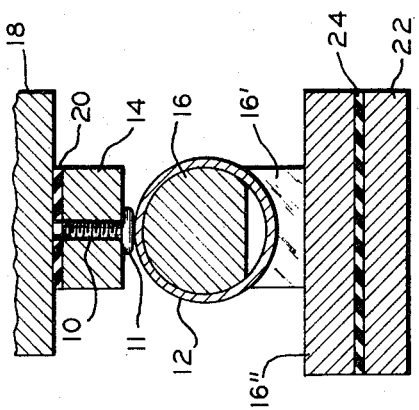
FIG. 3
INVENTOR.
DAVID G. ANDERSON
BY
Wilson & Fraser
ATTORNEYS INVENTOR.
DAVID G. ANDERSON
BY
Wilson & Fraser
ATTORNEYS

3,666,910

METHOD OF SOLID STATE BONDING AN ARTICLE TO A TUBE SURFACE

BACKGROUND OF THE INVENTION

In assemblies where it is desired to affix a threaded fastener, for example, to the exterior wall of a thin wall metal tube, the objective can be achieved only with considerable difficulty and expense. Typically, brazing techniques are employed to effectively produce the ultimate article. In such joining techniques, a fluxing material is needed to clean the metal surfaces of the parts to be joined. Also, a metal filler material is required and the parts must be heated to a temperature above the melting point of the metal filler. The melted metal filler then spreads out over the flux cleaned metal areas to effectively wet the facing surfaces of the parts to be joined.

Elaborate fixture mechanisms or joint preparation is necessary in the brazing techniques that are employed in order to assure that the fastener is precisely located on the tube. These locating means must remain in position at least until the assembly of parts has cooled sufficiently for the molten metal filler material to solidify.

Another type of welding which has been considered for bonding a fastener to a tube is conventional resistance projection welding. However, it has been found that said welding technique results in damage to the tube and therefore is unacceptable. The heat required to effect the desired weld by projection welding is of such a magnitude that distortion and severe metal expulsion occur. Also, the inside surface of the tube is damaged by the "burning through" during projection welding.

Electron beam welding has also been considered for the above purpose, but electron beam welding requires the electron beam to be confined to a very narrow region to cause localized melting of the tube and the associated fastener. To achieve the desired and necessary bond between a fastener and a tube, the electron beam must be moved at a controlled rate and along a discrete path to produce a weld of sufficient strength. Among the other disadvantages of electron beam welding include the high cost of the required equipment; the complexity of maintenance and repair problems due primarily to the associated high voltage and high vacuum systems; and the melting of the parts being bonded which is necessary to produce the weld requires so much heat energy that undesired distortion of the parts may occur.

SUMMARY

The disadvantages of the presently known techniques for achieving the objectives are substantially overcome by the utilization of the method and apparatus of the present invention resulting in a new article of manufacture. The objectives and advantages of the invention are achieved by disposing the parts to be integrated in contacting relationship followed by a time phased application of force pulse and an electrical energy pulse to the assembled parts to establish a current density within the range of from 500,000 to 3,000,000 amperes per square inch of weld interface for a period of typically the order of 0.5 to 5.5 milliseconds to effectively weld the parts together to form an integral unitary article.

BRIEF DESCRIPTION OF THE DRAWINGS

Other objectives and advantages of the invention will become readily apparent to those skilled in the art from reading the following detailed description of an embodiment of the invention when considered in the light of the accompanying drawings in which:

FIG. 1 is a flow diagram of the method of the invention;

FIG. 3 is a fragmentary sectional view of the electrode structure illustrated in FIG. 2 taken along line 3—3 thereof; and FIG. 4 is a perspective view of the completed unitary structure formed by the apparatus illustrated in FIGS. 2 and 3.

DESCRIPTION OF PREFERRED EMBODIMENTS

Figure 2:
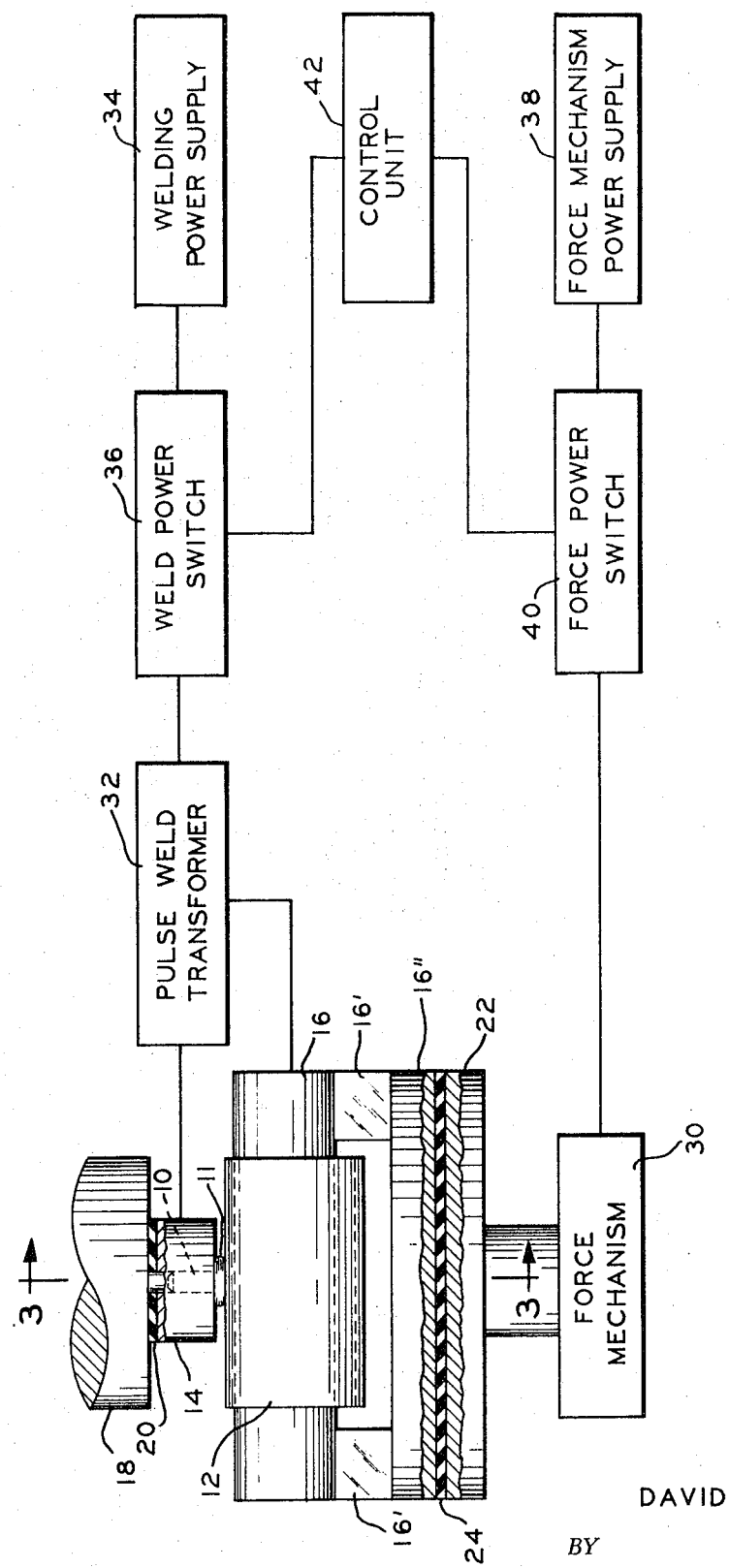
FIG. 2 is a schematic diagram of one typical form of the electrode structure and associated system

As diagrammatically illustrated in FIG. 1, the invention is concerned with a process for bonding two parts of electrically conductive metal together to form a unitary integral article. More specifically, the invention relates to a process for producing a solid state pulse resistance bond or weld between a thin walled tube and a fastener of electrically conductive metal to form a resultant unitary article of manufacture. The process involves the time phased application of a force pulse and a pulse of electrical energy of a current density within the range of from 500,000 to 3,000,000 amperes of the weld or faying interface of the parts being joined.

To completely understand the process of the invention, as illustrated in FIG. 1, reference will be made to the bonding of a fastener 10 to the outer surface of a tube 12 as specifically illustrated in FIGS. 2 and 3. At the commencement of the process, and with particular reference to FIGS. 2 and 3, the two parts 10 and 12 of electrically conductive metal such as, for example, mild steel (1010) wherein the tube 12 has a thickness of 0.058 inches are disposed in a manner wherein there is contact between a surface of the head 11 of the fastener 10 and the outer surface of the tube 12. An upper electrode 14 is provided with an internal cavity for containing the shank portion of the fastener 10. A lower electrode 16 is provided to support the tube 12. The uppermost electrode 14 is mounted on an upper platen or fixed support 18 electrically insulated therefrom by a layer of insulating material 20. The lowermost electrode 16 is mounted for unitary movement on a lower platen 22 and is electrically insulated therefrom by a layer of insulating material 24. The lower platen 22 is coupled to force mechanism 30 which may provide for selective reciprocating movement of the electrode 16 relative to the electrode 14 to initially enable the disposition of the parts 10 and 12 therebetween. At such stage in the operation, the electrodes 14 and 16 are moved toward one another until the assemblage of the parts 10 and 12 are in contacting relation.

The force mechanism 30, which typically includes a pressure transducer, is effective to apply a force pulse on the lower platen 22, which is superimposed on the initial forces applied by the initial closing movement of the electrodes 14 and 16 by the relative closing movement of the associated platens 18 and 22. The specific mechanism employed for developing the force by the force mechanism 30 may be of the type illustrated and described in the U.S. Patent to A.G. Vang — U.S. Pat. No. 3,059,094 — issued Oct. 16, 1962. It will be understood that in a time phased relation with the application of a force pulse on the sheets 10 and 12 by the force mechanism 30, an electrical energy pulse is applied to the electrodes 14 and 16, as will be explained in greater detail hereinafter.

It has been found that in practice, pressures developed of the order of from 2,000 to 3,000 pounds have been employed to produce satisfactory solid state welds with the described process. These pressures are not considered to be critical and may be varied over a rather wide range. The pressures imposed on the system can be imposed in sinusoidal wave form, and, typically, the force pulse is initiated first and before the force pulse reaches the maximum amplitude, the electrical energy pulse is commenced. Typically, the electrical energy pulse is then allowed to fully decay before the full decay of the force pulse. The electrical energy pulse is developed in the system illustrated in FIG. 2 in the secondary winding of a pulse weld transformer 32 which has its primary winding coupled to a weld power supply 34 through a suitable weld power switch 36. The weld power supply 34 typically includes a bank of capacitors and a charging circuit which are effective to produce an instantaneous source of electrical energy to the pulse weld transformer 32 as will be explained in greater detail hereinafter.

The force mechanism 30 is coupled to a force mechanism power supply 38 through a force power switch 40.

The weld power switch 36 and the force power switch 40 are controlled in timed relation to one another by a process control unit 42. The control unit 42 is effective to energize the respective power switches 36 and 40 in such a fashion that, typically, the force power switch 40 is energized to commence the application of force by the lower platen 22 to apply a force pulse at the interface of the parts 10 and 12. Then, the control unit 42 is effective to energize the weld power switch 36 to allow the capacitors of the weld power supply 34 to discharge and produce an electrical energy pulse in the primary winding of the pulse weld transformer 32. The secondary winding of the pulse weld transformer 32 causes a high electrical energy pulse between the electrodes 14 and 16 and the parts 10 and 12. An electrical energy pulse having a current density of the order of from 500,000 to 3,000,000 amperes per square inch of weld interface has been satisfactory for achieving the desired results of the invention of obtaining a solid state bond. In operation of the illustrated embodiment, the force pulse peaks in the order of from 0.5 to 2.0 milliseconds before the electrical energy peaks.

It has been theorized that the phenomenon involved in the welding process of the invention involves electrical energy at the interface of the parts 10 and 12 in magnitude sufficient to establish atomic bonds across the interface, resulting in a solid state pulse resistance weld. The electrical energy pulse applied by the pulse transformer 32 follows an electrical path through the electrode 14, the parts 10 and 12, and the electrode 16.

The control unit 42 is typically energized after the lower platen 22 and the upper platen 18 are initially closed to a point where the sheets 10 and 12 are firmly held between terminal ends of the electrodes 14 and 16. The energized control unit 42 initially signals the force switch 40 to couple the force mechanism 30 to its power supply 38 to effectively impart a force pulse of 8.0 millisecond duration, for example, with a peak force of approximately 2,000 pounds to the platen 22, causing the sheets 10 and 12 to be bonded to be forced tightly against the adjacent overlapped surfaces.

Typically, the control unit 42 is programmed to energize the weld power switch 36 coupling the pulse transformer 32 to the welding power supply 38 to thereby apply an electrical energy pulse to the electrode elements 14 and 16. The energization thereof commences, in the described embodiment, prior to the instant the force pulse reaches its peak amplitude.

The lower electrode illustrated in FIGS. 2 and 3 is comprised of a main beam portion 16 having an upper supporting surface which is contoured to conform generally to the shape of the internal surface of the tubular member which it is to support. The beam portion 16 of the lower electrode is supported by a pair of horizontally spaced supports 16' which in turn are supported on a base support 16''. The supports 16' are spaced apart horizontally a sufficient amount so that the tubular member 12 can be accommodated therebetween. At the conclusion of a welding cycle the beam portion 16 of the lower electrode is removed from the supports 16' to permit the removal of the tubular member 12 and the then integral fastener 10.

It will be understood that while it has been described that the lower platen 22 is movable satisfactory clearance could likewise be achieved by providing movement of the upper platen 18.

The invention has produced a novel method of producing a composite structure formed of a fastener 10 and a thin walled tube 12 wherein the parts are formed of a heat modifiable material and the total energy necessary to effect the bond or weld therebetween is minimal. A perspective view of the unitary article is illustrated in FIG. 4.

The temperature of the overall mass of the bonded members is raised only slightly during the bonding process, for example, 5° to 10° F., while at the interface where high electrical resistance exists, there is a small localized area of substantial thinness or surface skin which may approach melting or forging temperatures. The energy requirements are typically only 10 to 20 per cent of the magnitude of the energy requirements of conventional welding processes.

It will be understood by those skilled in the art that the above described invention produces a unitary structure formed of at least a pair of cooperating overlapped parts of electrically conductive material wherein, in each instance, the weld is formed in the zone defined by the overlapped portion of the parts. Thereby, the electrical path through the parts being welded is well defined and contributes to the minimization of heat energy buildup in the weld zone to effectively prevent any crystalline deformation of the internal structure of the metal being welded. The novel unitary structure of the invention and the method of forming the structures is of a substantial consequence to the field of welding and enables the production of parts heretofore impossible to achieve.

In accordance with the provisions of the patent statutes, I have explained the principal mode of operation of my invention and have illustrated and described what I now consider to represent its best embodiments. However, I desire to have it understood that the invention may be practiced otherwise than as specifically illustrated and described without departing from its spirit or scope.

What I claim is:

1. A method of welding a part of electrically conducting material to a tube of electrically conductive material comprising:

providing a first surface of said part;
providing a second surface of said tube;
engaging said first and second surfaces;
providing a pair of opposed cooperating electrodes, one of said electrodes engaging said part and the other of said electrodes contoured to contact an extended portion of the inner surface of said tube;
imposing a force pulse on the faying interface between said first and second surfaces to urge said surfaces into intimate contact; and
applying an electrical energy pulse between said electrodes to produce a current density within the range of from 500,000 to 3,000,000 per square inch of faying interface between said first and second surfaces desired to be welded in time phased relation with said force pulse to produce a solid state resistance bond to weld said surfaces together to form an integral bonded article.

2. The method as defined in claim 1 wherein said electrical energy pulse is applied as a single pulse.

3. The method as defined in claim 2 wherein said electrical energy pulse is of a duration of from 0.5 to 5.5 milliseconds.

4. The method defined in claim 1 wherein the force pulse applied to said surfaces arrives at its peak amplitude before the electrical energy pulse arrives at its peak magnitude.

5. The method as defined in claim 1 wherein said part is a fastener.

6. The method as defined in claim 5 wherein said fastener includes a threaded shank portion and an integral head portion, said head portion containing said first surface.

7. The method as defined in claim 5 wherein the wall of said tube is of the order of 0.05 inch in thickness.

* * * * *